May 6, 1952 H. A. NASON 2,595,874
INSULATION ARRANGEMENT FOR COMBINATION REFRIGERATORS
Filed Jan. 11, 1951
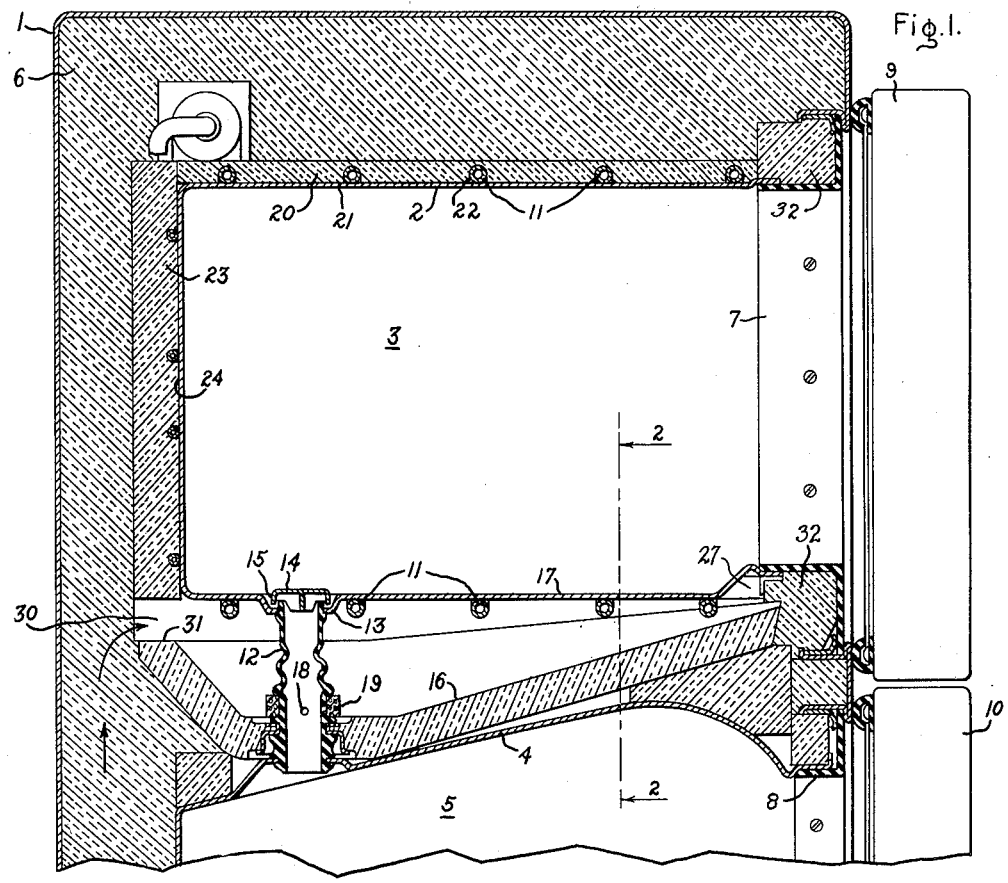
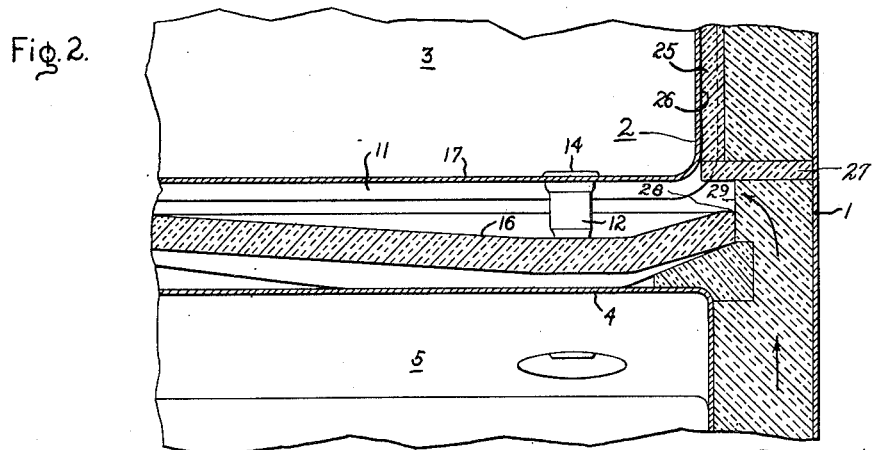
Inventor:
Harold A. Nason,
by William B. Edwards, Jr.
His Attorney.

Patented May 6, 1952

2,595,874

UNITED STATES PATENT OFFICE 2,595,874

INSULATION ARRANGEMENT FOR COMBINATION REFRIGERATORS

Harold A. Nason, Erie, Pa., assignor to General Electric Company, a corporation of New York Application January 11, 1951, Serial No. 205,497

4 Claims. (Cl. 62—103)

1

My invention relates to insulating arrangements for refrigerators and more particularly to insulating arrangements for combination refrigerators including a frozen food compartment and a fresh food compartment.

Many household refrigerators now being manufactured include two compartments, one of which is maintained at a low temperature in the order of 0° F. for properly preserving frozen foods and the other of which is maintained at a higher temperature, for example, in the neighborhood of 40° F., for properly preserving fresh foods. These refrigerators are usually constructed with a single outer wall and two inner liners spaced from the outer wall and defining respectively the frozen food compartment and the fresh food compartment. Such compartments are frequently refrigerated by evaporators which are secured to the exterior of the liners defining the compartments. Moisture from the atmosphere frequently finds its way into the space between the outer wall and the inner liners. Since the liner defining the frozen food compartment is maintained at a substantially lower temperature than that defining the fresh food compartment, this moisture tends to migrate to the liner of the frozen food compartment and to collect on the exterior thereof in the form of frost. Various fibrous insulations, such as glass wool which is frequently used as a heat-insulating material in the space between the inner and outer walls in many household refrigerators, are permeable to such moisture and the insulating effect of moisture-permeable insulations is substantially impaired should the frost collect on the exterior of the frozen food compartment and build out to a substantial extent into the glass wool insulation surrounding this compartment. Furthermore, when the frozen food compartment is defrosted such a substantial build-up of frost around the liner of this compartment then melts and passes into the moisture-permeable insulation surrounding the compartment, materially impairing its heat insulating value. By my invention, I have provided a particular arrangement of blocks of moisture-impervious heat insulating material disposed adjacent particular walls of the liner of the frozen food compartment to minimize collection of moisture and frost build-up on these walls into the moisture-permeable insulation, and I have further provided a preferential path through which the moisture migrating from the space surrounding the fresh food compartment liner may pass for collection on a portion of the frozen food liner wherein the frost build-up has no effect on

2 the moisture-permeable insulation and from which it is relatively easy to dispose of the melted frost during a defrosting period.

Accordingly, it is an object of my invention to provide an improved insulating arrangement for a combination refrigerator which facilitates the collection of frost on surfaces of the liner of the frozen food compartment from which it is most readily melted and disposed of during defrosting.

It is another object of my invention to provide an improved insulating arrangement which minimizes the collection of moisture and frost in insulation whose insulating value is impaired by a collection of moisture and frost therein.

It is a further object of my invention to provide an improved insulating arrangement for a combination refrigerator which includes a combined heat-insulating and water-collecting receptacle between the fresh food compartment liner and the frozen food compartment liner.

Further objects and advantages of my invention will become apparent as the following description proceeds and the features of novelty which characterize my invention will be pointed out with particularity in the claims annexed to and forming a part of this specification.

In carrying out the objects of my invention, blocks of moisture-impervious heat-insulating material are disposed adjacent the exterior of the liner of the frozen food compartment of the combination refrigerator along the top, back and the two sides of this liner. The bottom of the liner of the frozen food compartment is left open for the collection of frost thereon, and a water-collecting receptacle of moisture-impervious heat-insulating material is spaced from the bottom of the liner. In addition, barriers of moisture-impervious heat-insulating material are provided between the outer wall and the bottom edge of the liner of the frozen food compartment.

For a better understanding of my invention, reference may be had to the accompanying drawing in which Fig. 1 is a side sectional elevation view of the upper portion of the combination refrigerator including an embodiment of my invention; and Fig. 2 is a front sectional elevation view taken along a line 2—2 in Fig. 1.

Referring now to the drawing, there is shown a refrigerator including a metal outer wall 1, a metal liner 2 spaced from the outer wall and defining a frozen food compartment 3, and a second metal liner 4 also spaced from the outer wall 1 and defining a fresh food compartment 5. The major portion of the space between the outer wall 1 and the liners 2 and 4 is filled with a moisture-permeable heat-insulating material 6, such as glass wool. The space between the outer wall 1 and the liner 2 adjacent the access opening of the frozen food compartment 3 is closed by a breaker strip 7 which may be formed in one integral piece surrounding the entire access opening of this compartment or in a plurality of sections extending along the top, bottom, and two sides, respectively, of the access opening. The space between the liner 4 and the outer wall 1 adjacent the access opening of the fresh food compartment is similarly closed by a breaker strip 8. The access opening of the frozen food compartment 3 is closed by a door 9, and the access opening of the fresh food compartment 5 is similarly closed by a door 10.

The compartment 3 is refrigerated at a temperature of about 0° F., suitable for the proper preservation of frozen foods, by an evaporator, which includes a plurality of turns of tubing 11 secured to the exterior of the liner 2. Liquid refrigerant is supplied to the tubing 11 from any suitable condensing unit (not shown) for refrigerating the liner 2 and hence, the frozen food compartment 3. The fresh food compartment is maintained at a substantially higher temperature than that of the frozen food compartment, for example at a temperature in the neighborhood of 40° F. This compartment may be refrigerated in any conventional manner, for example, by an evaporator (not shown) disposed within the compartment 5. The evaporator may be supplied with refrigerant in any conventional manner, for example, by connecting the evaporator in series with the tubing 11 or by forming the evaporator as part of a secondary refrigerating system such as that disclosed in Patent 2,503,922, issued April 11, 1950, on an invention of Frank A. Schumacher, and assigned to the assignee of the present invention.

Since the frozen food compartment 3 is maintained at a temperature of about 0° F., moisture collects thereon in the form of frost and it is necessary at intervals to remove this frost and dispose of the water resulting from the melting thereof. To provide for the disposition of water resulting from frost melting within the compartment 3, a tube 12 of rubber or other flexible material is connected at one end to an opening in the bottom of the liner 2 and at the other end to an opening in the top of the liner 4. Water from the frozen food compartment flows through the tube 12 and is discharged at the lower end thereof into a suitable receptacle (not shown). Alternatively, the lower end of the tube 12 may be shaped, for example, in the manner illustrated in Patent 2,442,204, issued May 25, 1948, on an invention of Alfred G. Janos and assigned to the assignee of the present invention, to direct the water onto the liner 4 and thence down the rear wall of the liner for disposition in any suitable manner. In order to minimize communication between the compartments 3 and 5 during normal operation and thereby to assist in maintaining the proper temperature differential between these compartments, the upper end of the tube 12 is connected to the opening in the liner 2 at a depression or recess 13 therein and a plug or cap 14 rests on the upper end of the tube 12 and includes an overhanging lip 15 extending into the recess 13 and into the water or ice collecting in this recess to block passage of air between the compartments 3 and 5.

A water-collecting receptacle 16 is disposed below and spaced from the bottom wall 17 of the liner 2 for collecting water resulting from the melting of the frost on the exterior of the liner 2. Water resulting from the melting of frost on the exterior of the liner 2 falls into the receptacle 16 and is discharged into the tube 12 through passages 18, from whence it is discharged down the wall of the liner 4 in the same manner as the water passing from the interior of the compartment 3. An annular cellulose sponge, which readily passes water but minimizes passage of air is arranged around the tube 12 adjacent the openings 18 for minimizing air communication between the compartment 5 and the space below the bottom wall 17 of the liner 2. In order to provide not only for the collecting of the water resulting from the melting of the frost from the exterior of liner 2 but also for minimizing heat flow between the compartments 3 and 5 across the space between the bottom of the liner 2 and the top of the liner 4, the receptacle 16 is formed of moisture-impervious heat-insulating material, such as a foamed polystyrene, for example, that sold under the trade name "Styrofoam."

In ordinary household refrigerators, there is usually some leakage of moisture into the space between the outer wall and the inner liner or liners from the outside atmosphere. In a combination refrigerator, such as that described above, this moisture tends to migrate to the cold surface of the liner of the frozen food compartment, since this liner, as mentioned previously, is at a substantially lower temperature than the liner for the fresh food compartment. This moisture collects on the exterior of the liner 2 of the frozen food compartment in the form of frost. The glass wool insulation 6 is permeable to moisture and should the frost build up on the exterior wall of the liner 2 to an extent sufficient to extend substantially into the glass wool insulation 6, the insulating value of this glass wool insulation is impaired. Moreover, during the defrosting of the frozen food compartment, such frost melts and the water resulting therefrom tends to flow into and permeate the glass wool insulation, resulting in a substantial impairment of its heat-insulating value. By my invention, I provided an arrangement wherein the collection of frost in such a manner as to project into the glass wool insulation and the subsequent substantial wetting of this insulation during the defrosting period is minimized. Furthermore, I have provided an arrangement wherein a preferential path for moisture migrating within the insulation space is provided so that the frost preferentially collects on the bottom wall of the liner 2 from which the melted frost is easily disposed of and in which location it has no effect on the glass wool insulation which forms the major insulating medium of the refrigerator. To accomplish this result, blocks of moisture-impervious heat-insulating material, such as foamed polystyrene, are disposed adjacent the top, the back, and the two sides of the liner 2 which defines the frozen food compartment. Thus, referring to the drawing, a rectangular block or sheet 20 of such moisture-impervious heat-insulating material is disposed adjacent the exterior of the top wall 21 of the liner 2; the block 20 is secured to the top wall by gluing with an asphalt compound, recesses 22 being provided for the tubing 11. A block or sheet of similar material 23 is glued to the exterior of the back wall 24 of the liner 2, and similar blocks or sheets of moisture-impervious heat-insulating material, one of which is shown at 25, are glued to each side 26 of liner 2. These blocks of moisture-impervious heat-insulating material minimize the access of moisture to the areas of the top, back and two sides of the exterior of the liner 2. On the other hand, the bottom 17 of the liner is left exposed so that moisture within the insulation space has ready access to the cold surface of the bottom 17 and preferentially collects as frost thereon. From this portion of the evaporator the melted frost falls into the receptacle 16 and is readily disposed of. Moreover, there is no moisture-permeable glass wool insulation in this region and hence, the build-up of frost and the melted frost have no adverse effect upon the glass wool insulation.

To further assist in directing the moisture within the insulation space toward the exterior of the bottom 17 of the liner 2, a horizontally extending block or sheet 27 of moisture-impervious heat-insulating material, such as foamed polystyrene, is disposed between the outer wall 1 and the bottom of each of the blocks 25 which are located adjacent the sides 26 of the liner 2. Only one such block 27 is illustrated in Fig. 2 but it will be apparent that a similar construction is provided adjacent the opposite side of the liner 2. Each block 27 is arranged with its bottom surface in the plane of the bottom wall 17 of the liner 2 and extends substantially the full depth of the refrigerator from the front wall to the rear wall, thereby blocking the passage of moisture from the lower portion of the insulation space surrounding the liner 4 to the upper portion of the insulation space surrounding the liner 2. Moreover, each block 27 is positioned above the top of the adjacent edge 28 of the receptacle 16 so as to provide a space or passage 29 between the block 24 and the receptacle 16. Thus, the blocks 27 of moisture-impervious material deflect the moisture rising from the insulation space around the liner 4 into the space between the bottom wall 17 of the liner 2 and the receptacle 16, so that this moisture collects as frost on the bottom wall 17 from which, as mentioned previously, the melted frost can be readily disposed of. The path of the moisture, and its deflection through the space 29 is indicated generally by the arrows in Fig. 2. Moisture in the insulation space between the rear wall of the refrigerator and the rear wall of the liner 4 passes to the bottom wall 17 through the passage 30 between the rear edge 31 of the receptacle 16 and the bottom wall 17 of the liner 2, as indicated by the arrow in Fig. 1.

In order to further minimize the possibility of any substantial build-up of frost from the liner 2 to the outer wall in the region of the breaker strip 7 which might result in sweating in this region, blocks of similar moisture-impervious heat-insulating material are disposed immediately behind the breaker strip 7. These blocks of moisture-impervious heat-insulating material are indicated at 32 and are disposed behind the top, bottom and side breaker strips at the access opening of the frozen food compartment 3.

While I have shown and described a specific embodiment of my invention, I do not desire my invention to be limited to the particular construction shown and described and I intend, by the appended claims, to cover all modifications within the spirit and scope of my invention.

What I claim as new and desire to secure by Letters Patent of the United States is:

1. In a refrigerator including an outer wall, a first liner spaced from said outer wall and defining a frozen food compartment, a second liner spaced from said outer wall and defining a fresh food compartment, an insulating structure for said frozen food compartment which includes a plurality of blocks of moisture-impervious heat-insulating material disposed in contact with the exterior surfaces of the top, back and sides respectively of said first liner, the exterior surface of the bottom of said first liner being exposed for the collection of frost thereon, moisture-permeable heat-insulating material between said moisture-impervious material and said outer wall, means for cooling said first liner to maintain said first liner at a temperature substantially below the freezing point of water and substantially below the temperature of said second liner, and a water-collecting receptacle positioned below said first liner for collecting defrost water dripping from said first liner, said receptacle being spaced from said first liner to afford a passage for moisture from the space between said second liner and said outer wall to the bottom of said first liner.

2. In a refrigerator including an outer wall, a first liner spaced from said outer wall and defining a frozen food compartment, a second liner spaced from said outer wall and defining a fresh food compartment, an insulating structure for said frozen food compartment which includes a plurality of blocks of moisture-impervious heat-insulating material disposed in contact with the exterior surfaces of the top, back and sides respectively of said first liner, the exterior surface of the bottom of said first liner being exposed for the collection of frost thereon, moisture-permeable heat-insulating material between said moisture-impervious material and said outer wall, means for cooling said first liner to maintain said first liner at a temperature substantially below the freezing point of water and substantially below the temperature of said second liner, and a water-collecting receptacle positioned below said first liner for collecting defrost water dripping from said first liner, said receptacle being spaced from said first liner to afford a passage for moisture from the space between said second liner and said outer wall to the bottom of said first liner, said water-collecting receptacle being composed of moisture-impervious heat-insulating material to provide a heat-insulating barrier between said first liner and said second liner.

3. In a refrigerator including an outer wall, a first liner spaced from said outer wall and defining a frozen food compartment, a second liner spaced from said outer wall and defining a fresh food compartment, an insulating structure for said frozen food compartment which includes a first block of moisture-impervious heat-insulating material disposed adjacent the exterior surface of the top of said first liner, a second block of moisture-impervious heat-insulating material disposed adjacent the exterior of the back of said first liner, and two side blocks of moisture-impervious heat-insulating material each disposed adjacent the exterior surface of a corresponding side of said first liner, the exterior surface of the bottom of said first liner being exposed for the collection of frost thereon, moisture-permeable heat-insulating material between said moisture-impervious material and said outer wall, means for cooling said first liner to maintain said first liner at a temperature substantially below the freezing point of water and substantially below the temperature of said second liner, a water-collecting receptacle positioned below said first liner for collecting defrost water dripping from said first liner, said receptacle being spaced from said first liner to afford a passage for moisture from the space between said second liner and said outer wall to the bottom of said first liner, and two horizontally-extending blocks of moisture-impervious heat-insulating material each extending between said outer wall and the bottom edge of the corresponding one of said side blocks and above the top edge of said receptacle to cause moisture rising from the space between said outer wall and said second liner to be deflected toward said bottom of said first liner whereby said moisture collects as frost on said bottom of said first liner.

4. In a refrigerator including an outer wall, a first liner spaced from said outer wall and defining a frozen food compartment, a second liner spaced from said outer wall and defining a fresh food compartment, a breaker strip structure for closing the space between said outer wall and said first liner at the access opening of said frozen food compartment, said breaker strip structure including top, bottom and side portions, a plurality of blocks of moisture-impervious heat-insulating material disposed adjacent the interior surfaces of said top, bottom and side portions respectively of said breaker strip structure, an insulating structure for said frozen food compartment which includes a plurality of blocks of moisture-impervious heat-insulating material disposed adjacent the exterior surfaces of the top, back and sides respectively of said first liner, the exterior surface of the bottom of said first liner being exposed for the collection of frost thereon, moisture-permeable heat-insulating material between said moisture-impervious material and said outer wall, means for cooling said first liner to maintain said first liner at a temperature substantially below the freezing point of water and substantially below the temperature of said second liner, and a water-collecting receptacle positioned below said first liner for collecting defrost water dripping from said first liner, said receptacle being spaced from said first liner to afford a passage for moisture from the space between said second liner and said outer wall to the bottom of said first liner.

HAROLD A. NASON.

REFERENCES CITED

The following references are of record in the file of this patent:

UNITED STATES PATENTS

| Number | Name | Date |
|---|---|---|
| 2,442,204 | Janos | May 25, 1948 |
| 2,478,017 | Shoemaker | Aug. 2, 1949 |
| 2,552,345 | Philipp | May 8, 1951 |